United States Patent [19]

Oshima

[11] 4,408,681
[45] Oct. 11, 1983

[54] DISC BRAKE

[75] Inventor: Harumi Oshima, Kawasaki, Japan

[73] Assignee: Tokico Ltd., Kawasaki, Japan

[21] Appl. No.: 274,452

[22] Filed: Jun. 17, 1981

[30] Foreign Application Priority Data

Jun. 23, 1980 [JP] Japan ............................. 55-87846[U]

[51] Int. Cl.$^3$ ............................................ F16D 65/02
[52] U.S. Cl. ................................................ 188/73.38
[58] Field of Search ............... 188/73.35, 73.36, 73.37, 188/73.38

[56] References Cited

U.S. PATENT DOCUMENTS

| | | | |
|---|---|---|---|
| 4,162,721 | 7/1979 | Moriya | 188/73.38 |
| 4,171,037 | 10/1979 | Souma et al. | 188/73.38 |
| 4,181,200 | 1/1980 | Souma | 188/73.38 |
| 4,296,844 | 10/1981 | Tamura et al. | 188/73.38 |

FOREIGN PATENT DOCUMENTS 5485274 11/1977 Japan .

Primary Examiner—Duane A. Reger
Attorney, Agent, or Firm—Fleit, Jacobson, Cohn & Price

[57] ABSTRACT

A disc brake including a stationary member having a pair of legs spaced in the direction of the circumference of a rotatable disc and straddling respectively the outer circumference of the disc to define respectively thereon pad guiding portions which are interrupted by respective grooves in the legs, a pair of friction pads disposed on opposite sides of the disc and slidably supported on the pad guiding portions, a caliper supported slidably on the stationary member, and a pad spring provided between the stationary member and the friction pads. The pad spring is retained on the stationary member and has a stop for restricting the sliding movement of at least one friction pad approaching toward the disc.

3 Claims, 9 Drawing Figures

DISC BRAKE

BACKGROUND OF THE INVENTION

This invention relates to a disc brake and, particularly to a disc brake of the kind including a stationary member adapted to be secured to a non-rotatable part of a vehicle at one side of a rotatable disc, a pair of legs of the stationary member spaced in the direction of the circumference of the disc and straddling the outer circumference of the disc to extend to the other side of the disc, a pad guiding portion provided on each of the legs of the stationary member to support slidably thereon a pair of friction pads, and a pad spring acting between the friction pads and the stationary member to bias the friction pads against the pad guiding portions.

The pad guiding portions are usually interrupted by circumferential grooves which are formed in respective legs for rotatably receiving the outer circumference of the disc, thus, when the friction pads have worn excessively, or when the disc brake has not been assembled with the vehicle, the friction pads will sometimes escape from the pad guiding portions. The latter case complicates substantially the assembling operation.

SUMMARY OF THE INVENTION

An object of the present invention is to eliminate shortcomings described as above by providing a stop on the pad spring so as to restrict the movement of the pad spring in the direction of the axis of the disc, with the pad spring being retained on the stationary member.

BRIEF DESCRIPTION OF THE DRAWINGS

The invention will hereinafter be explained in detail in conjunction with the accompanying drawings exemplifying some preferable embodiments of the invention.

In the drawings.

DETAILED DESCRIPTION OF THE PREFERRED EMBODIMENT

Figure 1:
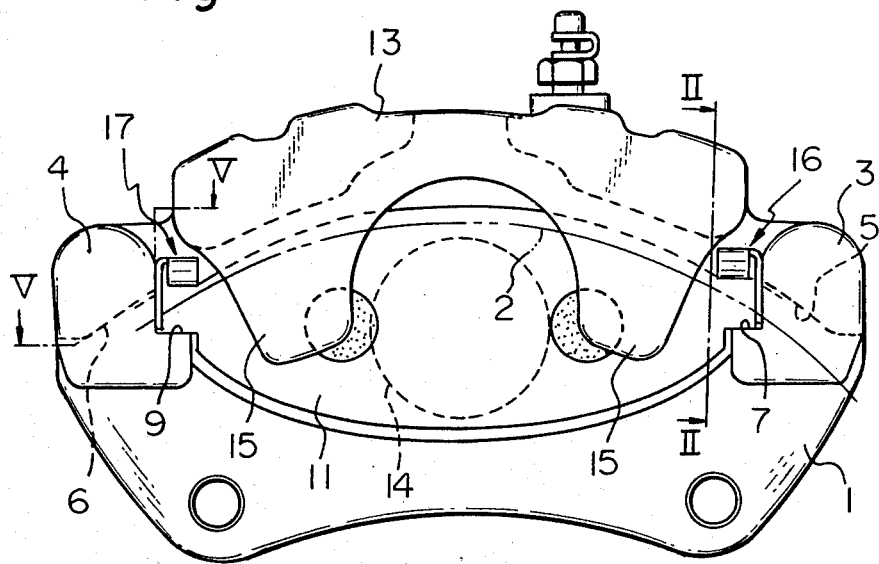
FIG. 1 is a front view of a disc brake according to the invention.

The disc brake illustrated in FIGS. 1-5 comprises a stationary member 1 which is adapted to be secured to a non-rotatable part (not shown) of a vehicle at one side of a rotatable disc 2, a pair of friction pads 11 and 12, a caliper 13 slidably mounted on the stationary member 1 and a pair of pad springs 16 and 17. The stationary member 1 includes a pair of legs 3 and 4 which are spaced in the direction of the circumference of the disc and straddle respectively the circumference of the disc 2 to extend to the other side (the right side as viewed in FIG. 2) of the disc 2. There are provided pad guiding portions 7 and 8, and 9 and 10 respectively on respective legs 3 and 4 which extend in the direction of the axis of the disc 2 for supporting thereon and guiding the friction pads 11 and 12. The friction pad 11 is supported on the pad guiding portions 7 and 9, and the friction pad 12 is supported on the pad guiding portions 8 and 10. The pad guiding portions 7 and 8 on the leg 3 and the pad guiding portions 9 and 10 on the leg 4 respectively align with each other in the direction of the axis of the disc 2, however, they are interrupted respectively by circumferential grooves 5 and 6 which are provided in axially intermediate portions of the legs 3 and 4 through which the outer circumferential portion of the disc 2 can freely pass.

The caliper 13 is supported slidably on the stationary member 1 through a pair of circumferentially spaced and axially extending parallel pins (not shown) and incorporates therein a piston 14 for pressing one friction pad 12 against one surface of the disc 2 and straddles the outer circumference of the disc 2 to define a limb portion 15 which presses the other friction pad 11 against the other surface of the disc 2.

Figure 2:
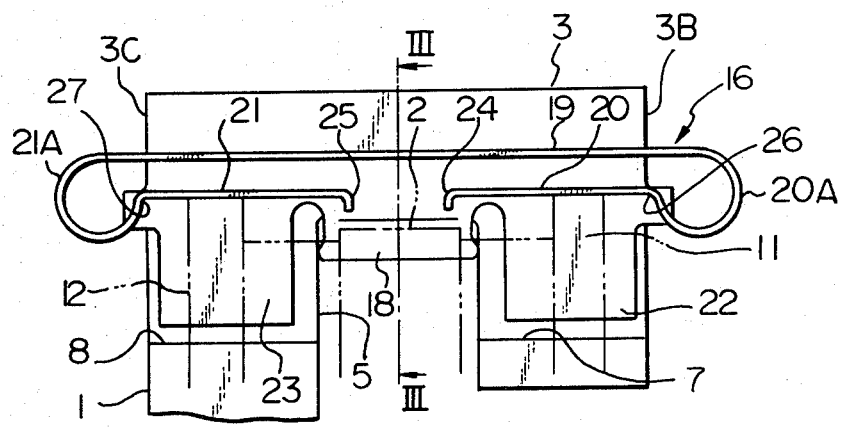
FIG. 2 is a sectional view taken along line II—II in FIG. 1.
Figure 3:
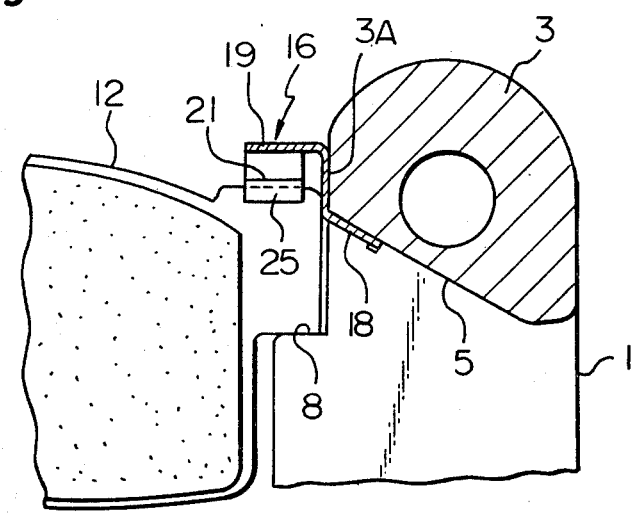
FIG. 3 is a sectional view taken along line III—III in FIG. 2.
Figure 4:
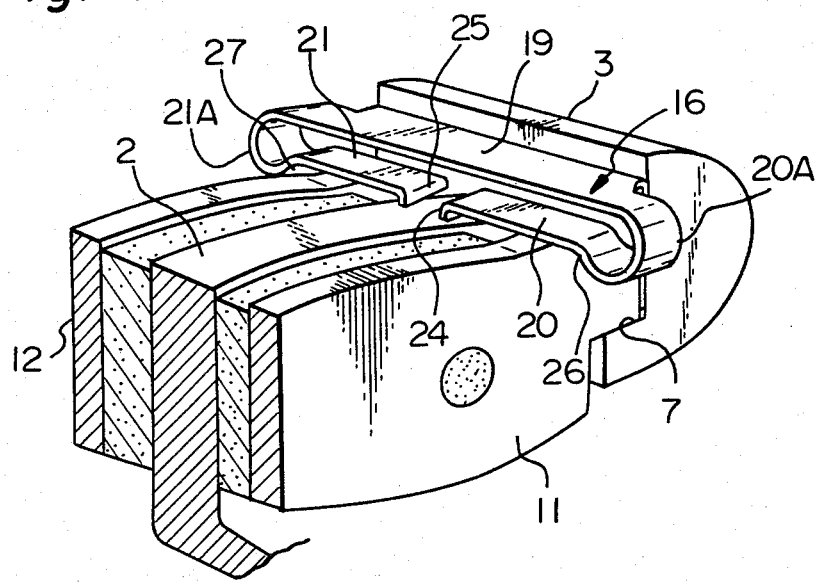
FIG. 4 is a perspective view showing the essential portion of FIG. 1.
Figure 5:
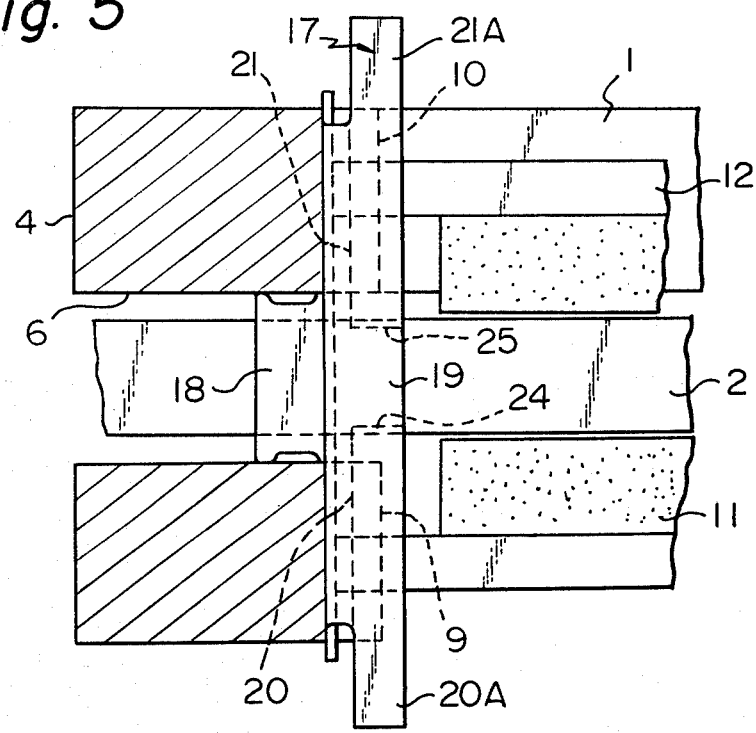
FIG. 5 is a sectional view taken along line V—V in FIG. 1.
Figures 6, 7:
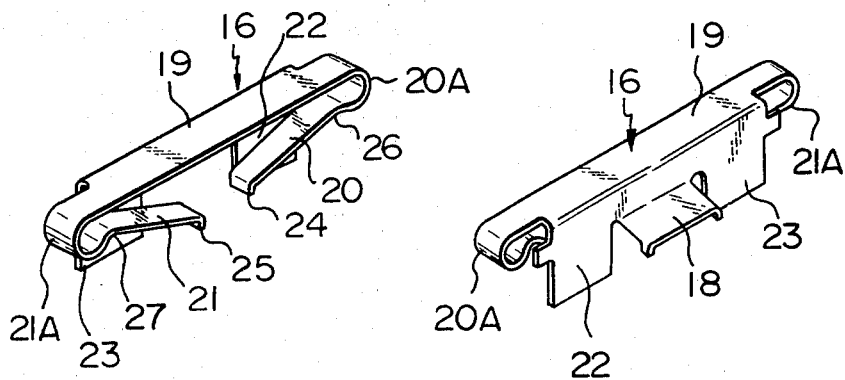
FIG. 6 and FIG. 7 are perspective views of the pad spring of FIG. 1.

There are provided pad springs 16 and 17 between the friction pads 11 and 12 and legs 3 and 4 of the stationary member 1 for resiliently pressing the friction pads 11 and 12 radially inwardly toward pad guiding portions 7, 8, 9 and 10. The pad springs 16 and 17 are identical and, thus, the description will hereinafter be made with respect to the pad spring 16. The pad spring 16 is formed of a resilient plate member and comprises a main body portion 19 extending along the circumferentially inner wall 3A of the leg 3 and being bent circumferentially inward to extend over the circumferentially outer ends of the friction pads 11 and 12, a retaining portion 18 connected to the axially central and radially inner portion of the main body portion 19 and being bent therefrom to extend generally along the inner surface of the groove 5 and to engage therewith, and pad pressing portions 20 and 21 engaging with radially outer (upper as seen in FIG. 2) surfaces of friction pads 11 and 12 respectively. The pad pressing portions 20 and 21 extend in the direction of the axis of the disc 2 and are connected to the axially opposite ends of the main body portion 19 through generally arcuate portions 20A and 21A respectively. The retaining portion 18 prevents the movement of the pad spring 16 relative to the leg 3 in the direction of the axis of the disc 2 and in the direction radially outwards with respect to the axis of the disc 2. The pad pressing portions 20 and 21 resiliently press the friction pads 11 and 12 against pad guiding portions 7 and 8 respectively. There are provided on the axially opposite sides of the retaining portion 18 tongue portions 22 and 23 which extend radially inwards and axially along the inside wall 3A of the leg 3 to interpose between the wall 3A and circumferential end surfaces of the friction pads 11 and 12 respectively. The tongue portions 22 and 23 restrict the movement of friction pads 11 and 12 in the direction of the circumference of the disc 2.

According to the invention, stops 24 and 25 are provided on the tip ends (axially inner ends) of pad pressing portions 20 and 21 respectively to restrict the movement of the friction pads 11 and 12 in the direction approaching the disc 2. Thus, the stops 24 and 25 effectively prevent the friction pads 11 and 12 from escaping out of pad guiding portions 7 and 8 through the space between the pad guiding portions and the disc 2. The stops 24 and 25 are formed by bending radially inwards the distal ends of pad pressing portions 20 and 21.

Further, there are provided stops 26 and 27 between the pad pressing portions 20 and 21 and the arcuate portions 20A and 21A. The stops 26 and 27 effectively restrict the movement of the friction pads 11 and 12 in the direction separating from the disc 2, so as to prevent the friction pads 11 and 12 from escaping out of axially outer ends of the pad guiding portions 7 and 8.

Since the pad spring 17 is symmetrical to the pad spring 16 and the construction thereof is similar to that of the pad spring 16, the same reference numerals are applied to corresponding parts and the detailed description therefor are omitted.

In assembling the disc brake with the body of the vehicle, the caliper 13 is firstly mounted on the stationary member 1 and retaining portions of pad springs 16 and 17 are fitted with the grooves 5 and 6 in the legs 3 and 4 of the stationary member 1 thereby mounting the pad springs on the stationary member 1. The friction pads 11 and 12 are sequentially mounted on the pad guiding portions 7 and 9 and 8 and 10 by utilizing disc receiving space or the space defined between the pad guiding portions 7 and 8 and between the pad guiding portions 9 and 10 and by resiliently displacing the pad pressing portions 20 and 21 of pad springs 16 and 17 and by displacing the friction pads 11 and 12 axially outward direction. Thereafter, the stationary member 1 is mounted on the body of the vehicle. The friction pads 11 and 12 are reliably mounted on the pad guiding portions 7, 8, 9 and 10 and the movement thereof in the direction approaching or separating from the grooves 5 and 6 can effectively be prevented by stops 24, 25, 26 and 27, thus the friction pad will not escape out of the pad guiding portions.

Figure 8:
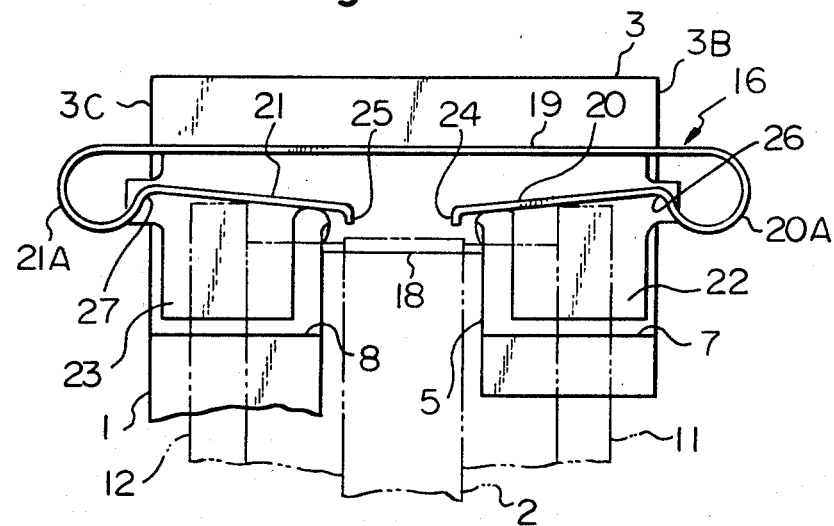
FIG. 8 is a view similar to FIG. 2 but showing another embodiment of the invention.

FIG. 8 shows another embodiment. The embodiment is generally similar to the first embodiment, and corresponding parts are depicted by the same reference numerals.

In FIG. 8, pad pressng portions 20 and 21 are inclined downwardly (radially inwardly) from arcuate portions 20A and 21A toward the inner ends 24 and 25 in engaging with friction pads 11 and 12. The pad springs act to press the friction pads 11 and 12 against pad guiding portions, and also act to press the friction pads in the direction separating from the disc 2. Thus, the friction pads reliably separate from the disc in releasing the brake applying force.

Although the drawings show only two embodiments of the invention, the invention is not limited to such embodiments and includes the following modifications.

(a) The retaining portion 18 is provided on the axially central portion of the pad spring in the embodiments, however, the retaining portion may be provided on either or both of axially opposite ends of the pad spring.

Figure 9:
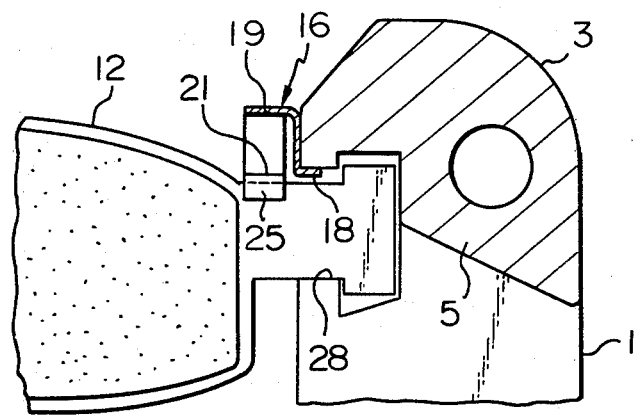
FIG. 9 is a partially sectional front view of a further embodiment of the invention.

(b) The pad guiding portion may be defined by axially extending groove or recess 28, as shown in FIG. 9, which opens in the inner wall 3A of the stationary member 1. In FIG. 9, the retaining portion 18 engages with the upper wall of the recess 28 thereby preventing the pad spring 16 from escaping out in the radially outward direction or in the upward direction as seen in FIG. 9.

(c) The stops 26 and 27 may be omitted.

As clearly be understood from the foregoing explanation, the pad spring according to the invention has a stop restricting the movement of a friction pad in the direction of the axis of the disc, it is possible to prevent the friction pad from escaping out of the pad guiding portions during the mounting operation of the disc brake or the friction pad exchanging operation. Thus, such operations can reliably and quickly be performed. Further, the stops are provided on the pad spring by a simple bending operation, thus, the invention can easily be applied without modifying the stationary member.

What is claimed is:

1. A disc brake comprising:
   a stationary member adapted to be secured to a nonrotatable part of a vehicle at one side of a rotatable disc and including a pair of legs spaced in the direction of the circumference of the disc, said legs straddling the outer circumference of the disc to extend to the other side of the disc and having respectively pad guiding portions extending in a direction parallel to the axis of the disc, each of said pad guiding portions being interrupted by a circumferential groove in each of said legs which rotatably receives the outer circumference of the disc;
   a pair of friction pads disposed on the opposite sides of the disc and supported slidably on the guiding portions; and
   a pad spring retained on the stationary member for biasing the friction pads against the pad guiding portions, said pad spring comprising a main body portion retained on said stationary member, generally arcuate portions connected to axial ends of the main body portion, and pressing portions connected respectively to respective arcuate portions and extending axially inwardly and radially inwardly therefrom in inclined fashion, said pressing portions pressing respective friction pads radially inwardly and in the direction separating the friction pads from the disc, said arcuate portions and said pressing portions defining therebetween stops which act to prevent the movement of the friction pads in the direction separating the friction pads from the disc.

2. A disc brake as set forth in claim 1, wherein a pair of pad springs acts on the circumferentially opposite ends of the friction pads to bias the friction pads against said pad guiding portions.

3. A disc brake as set forth in claim 2, wherein each of said pad springs has further stops for restricting the movement of the friction pads in the direction approaching the disc.

* * * * *